(12) United States Patent
Tanaka et al.

(10) Patent No.: US 7,124,053 B2
(45) Date of Patent: Oct. 17, 2006

(54) IMAGE PROCESSING METHOD AND APPARATUS THEREFOR

(75) Inventors: Rika Tanaka, Tokyo (JP); Kiyohide Satoh, Tokyo (JP); Kazuki Takemoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/837,480

(22) Filed: Apr. 29, 2004

(65) Prior Publication Data

US 2004/0220767 A1  Nov. 4, 2004

(30) Foreign Application Priority Data

May 2, 2003  (JP) .............................. 2003-127096

(51) Int. Cl.
*G01C 9/00* (2006.01)
(52) U.S. Cl. ................................... 702/152
(58) Field of Classification Search ................ 702/152; 384/141
See application file for complete search history.

(56) References Cited

U.S. PATENT DOCUMENTS

| | | | | |
|---|---|---|---|---|
| 4,922,909 A | * | 5/1990 | Little et al. ................. | 600/300 |
| 5,073,819 A | * | 12/1991 | Gates et al. ................. | 348/140 |
| 6,061,644 A | * | 5/2000 | Leis ........................... | 702/153 |
| 6,151,069 A | * | 11/2000 | Dunton et al. ........... | 348/220.1 |
| 6,473,716 B1 | * | 10/2002 | Ohishi et al. ............... | 702/152 |
| 6,556,722 B1 | * | 4/2003 | Russell et al. .............. | 382/291 |
| 6,697,761 B1 | * | 2/2004 | Akatsuka et al. ........... | 702/151 |

* cited by examiner

*Primary Examiner*—John Barlow
*Assistant Examiner*—Jonathan Moffat
(74) *Attorney, Agent, or Firm*—Canon U.S.A. Inc. IP Division (57) ABSTRACT

A system is provided for obtaining parameters about the position and orientation of a camera, where the camera has a fixed position and orientation, by using the image coordinates and world coordinates of markers included in an image photographed by the camera. This system uses a live-image display mode for successively obtaining images input to the camera and a still-image display mode for obtaining an image input to the camera at predetermined time. The markers can be extracted by using the image obtained in either mode. The system can select either automatic-extraction mode or manual-extraction mode for extracting the marker in live images, so that the markers can be extracted with a high degree of accuracy under all conditions to obtain the position and orientation parameters of the camera.

14 Claims, 4 Drawing Sheets

IMAGE PROCESSING METHOD AND APPARATUS THEREFOR

BACKGROUND OF THE INVENTION

1. Field of the Invention

The present invention relates to an image processing method and an apparatus therefore for performing calibration of the position and orientation of an image pickup device.

2. Description of the Related Art

Conventional methods for calibrating the position and orientation of a camera that is fixed in a predetermined space are well known. According to one method, a plurality of markers with known coordinates in a three dimensional space (hereinafter referred to as "world coordinates") are photographed by the camera and the position and orientation of the camera is calculated. The position and orientation satisfies the relationship between the world coordinates of the markers and the coordinates of the markers in the photographed image. That is, this calculation solves the perspective n-point (PnP) problem.

In this method, the markers are extracted from the photographed image and are identified using a marker extraction process. This marker extraction process can be performed either automatically, manually or by a combination of both.

Where the marker extraction process is performed manually by the operator, the photographed image is displayed as a still image on a display. Then, the operator clicks the mouse button on the positions of the markers on the displayed image to input image coordinates of the markers.

Where the marker extraction process is performed automatically, image processing is performed for the still image, which is photographed by the camera, by setting and adjusting marker extraction parameters for determining the threshold values of colors for extraction and the sizes of the markers.

However, marker extraction can be impacted by image brightness. When the contrast level of the image is low in accordance with the brightness of a photographed space and a photographing direction, it becomes difficult to identify the markers on the photographed image. It should be noted that appropriate lighting can be performed during photographing. Where the marker extraction process is performed automatically, the marker extraction parameters need to be adjusted. Therefore, much trial and error is required for setting predetermined surroundings for performing good marker extraction process.

Further yet, a known method for automatically extracting markers captures a still image in order to extract the markers. If the markers cannot be properly extracted, the surrounding thereof is changed and photographed again. Then, the marker extraction is repeated. Thus, the marker extraction process needs to be performed repetitively. Where the marker extraction process is manually performed by the operator, a photographed image must be repetitively input so as to make information required for the marker extraction visible for every marker.

SUMMARY OF THE INVENTION

According to one aspect of the present invention, at least one mode is selected from among a plurality of obtain modes including a first obtain mode for obtaining images picked up by an image pickup device, as moving images, and a second obtain mode for obtaining at least one image picked up by the image pickup device, as a still image. Then, an image picked up by the image pickup device in the selected obtain mode is obtained. Further, a marker included in the obtained image is extracted, and information about the position and orientation of the image pickup device is derived by using the image coordinates of the extracted marker.

Further features and advantages of the present invention will become apparent from the following description of the embodiments (with reference to the attached drawings).

DETAILED DESCRIPTION OF THE INVENTION

Embodiments of the present invention will now be described in detail with reference to the attached drawings.

First Embodiment

A first embodiment of the present invention provides a system for calibrating the position and orientation of a fixed camera. The camera photographs a marker with known world coordinates and the calibration system calculates a position and orientation of the camera (camera external parameters), where the position and orientation satisfies the relationship between the world coordinates of the marker and the image coordinates thereof.

The following factors are used in this embodiment:

1. the world coordinates of at least three markers that are not in line with one another;

2. the image coordinates of the markers on an image photographed by the camera; and 3. the initial values (roughly estimated values) of the position and orientation of the camera in a world-coordinate system.

The theoretical value of the image coordinates of each of the markers is calculated based on the world coordinates of the marker and the position and orientation of the camera. Then, a position and orientation of the camera for minimizing the sum of differences between the theoretical values of the markers and the measurement values thereof is calculated. This process is referred to as camera calibration.

The data given under 1. and the data given under 3. is prepared before starting the calibration process, as known information. At least three markers (landmarks or feature points) with known world coordinates must be determined in a real space photographed by the camera. These markers have certain features, which can be detected and identified on an image photographed by the camera. For example, markers feature colored circles, each of which has a different color. In the world coordinate system, a point is selected to be an origin from which the X, Y, and Z axes extend. Next, the distance between the origin point and each of the three markers along each of the X, Y, and Z directions is measured. Although the data given under 3., that is, the initial values of the position and orientation of the camera is often unnecessary, it facilitates obtaining correct solutions to the above-described calculation. Therefore, the initial values are roughly estimated.

The data given under 2. calculates the position and orientation of the camera. This data is obtained when markers are extracted from an image photographed by the camera. In this embodiment, the marker extraction process can be automatically performed by using marker extraction parameters, described below. Further, the operator can manually input the marker positions.

Figure 1:
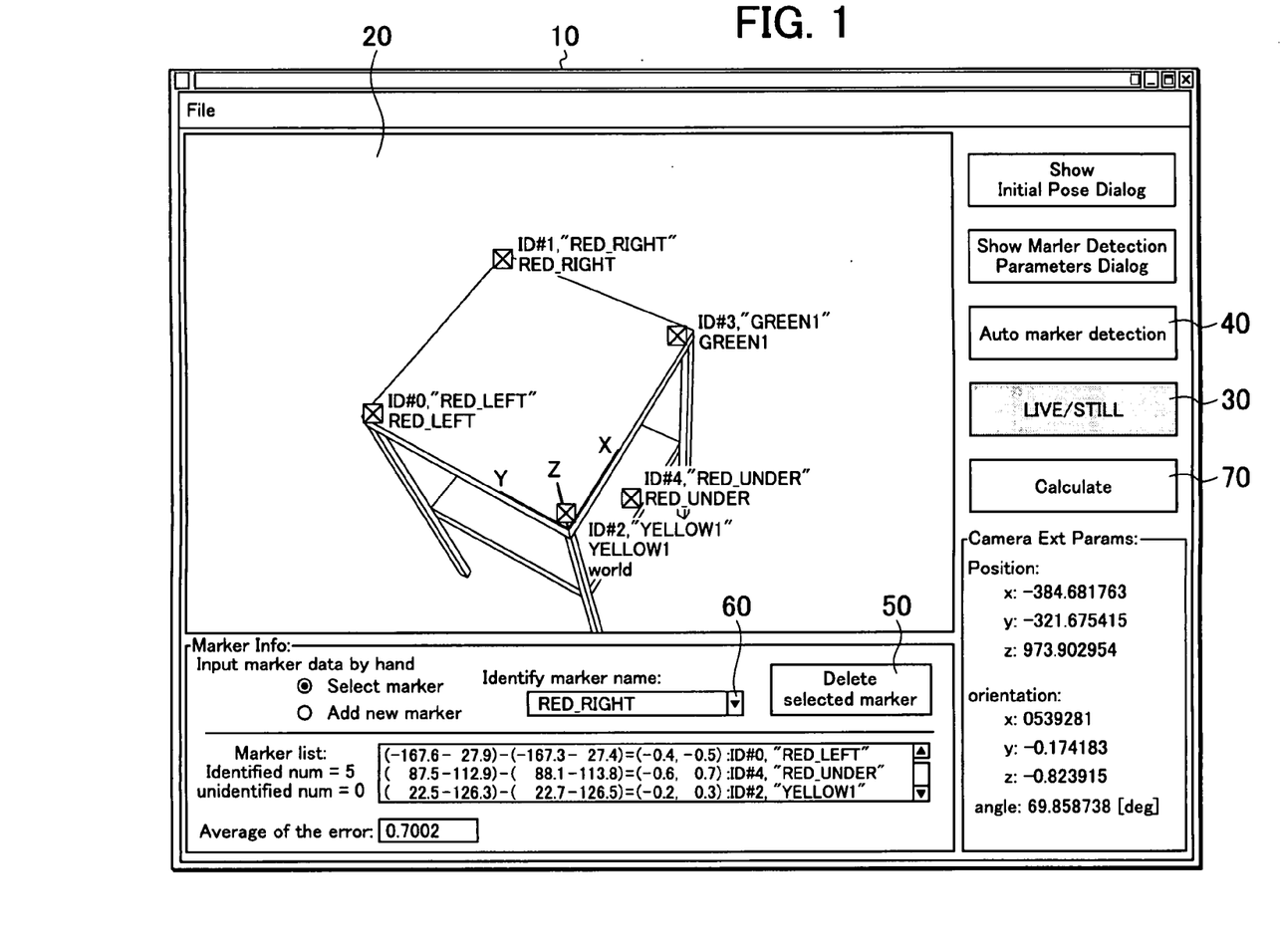
FIG. 1 illustrates a UI (User Interface) for performing marker extraction according to a first embodiment of the present invention.

According to this embodiment, a user interface (UI) 10 for the marker extraction process is provided, as shown in FIG. 1. This UI 10 has an image display unit 20 for displaying both the image and the result of the marker extraction process. In this drawing, each of the positions of extracted markers is indicated by a symbol × and each of the identified markers is enclosed by a box.

This UI 10 has the function of selecting the image-display mode. The operator can switch between live-image display mode and still-image display mode by pressing a live/still button 30. When this apparatus is started, the live-image mode is selected. In this mode, the image-display unit 20 displays the latest live images that are successively photographed by the camera. These live images become the subject of the marker extraction process. Hereinafter, "subject image," is one that is displayed on the image-display unit 20 and that is the subject of the marker extraction process. In the still-image display mode, a previously read image becomes the subject image. More specifically, in the still-image display mode, an image that is input at the time when the display mode is switched from the live-image display mode to the still-image display mode through the live/still button 30 becomes the subject image.

If the level of noise detected in the marker extraction process is high, the operator can select the live-image display mode by using the above-described image-display-mode switching function. In this case, since the operator can change the brightness of images while observing the images changing in real time, suitable brightness for performing the automatic marker extraction process can be obtained to extract the markers. Further, where the operator extracts markers manually and where the entire markers are not visible at the same time, the operator can successively extract markers shown on live images. However, if it is difficult to keep photographing markers due to constant movement of people, for example, the still-image display mode can be selected after the initial photograph of the markers. Subsequently, the operator can perform the marker extraction process without being affected by such constant movement of people.

This UI 10 also functions to select the marker-extraction process mode. This marker-extraction process mode is provided for determining whether markers on a subject image are extracted manually or automatically. Therefore, the marker-extraction process mode includes automatic-extraction process mode and manual-extraction process mode. A marker-extraction switch button 40 is used for switching back and forth between the automatic-extraction process mode and the manual-extraction process mode. In the automatic-extraction process mode, the subject image is subjected to image processing according to marker-extraction parameters, described below, so that the markers are extracted automatically. In the manual-extraction process mode, the operator can manually input the positions of the markers on the subject image by clicking the mouse button on the marker positions on the subject image displayed on the image-display unit 20. Further, the operator can select any of the markers by clicking the mouse button on the marker on the subject image displayed on the image-display unit 20, delete a marker extracted by mistake by using a marker delete button 50, and identify and correct any of the markers by using a marker-identification pull-down menu 60. In this manual-extraction process mode, the operator can manually correct part of markers extracted by mistake by using the result of extraction process obtained in the automatic-extraction process mode. Note that the operator can extract all of the markers manually without using the result of the automatic extraction process.

Further, the operator can use UI 10 to change the marker extraction parameters in an interactive manner through an input unit (not shown). The marker extraction parameters include parameters for specifying a predetermined marker for extraction, where the above-described marker-extraction process mode is the automatic-extraction process mode. These parameters include, for example, the threshold values of different colors including red, green, and blue, and the sizes of markers. Note that these parameters for performing the marker extraction process should be correctly set. In the automatic-extraction process mode, the operator can adjust the marker extraction parameters through this UI 10 with trial and error by referring to the result of the marker extraction process.

A camera-parameter calculation execution button 70 is provided on the UI 10. When the operator presses this button 70 after the marker extraction process is finished, a position and orientation of the camera is calculated, where the position and orientation satisfies the relationship between the image coordinates of the extracted marker and the world coordinates thereof. This process is referred to as camera calibration.

Figure 2:
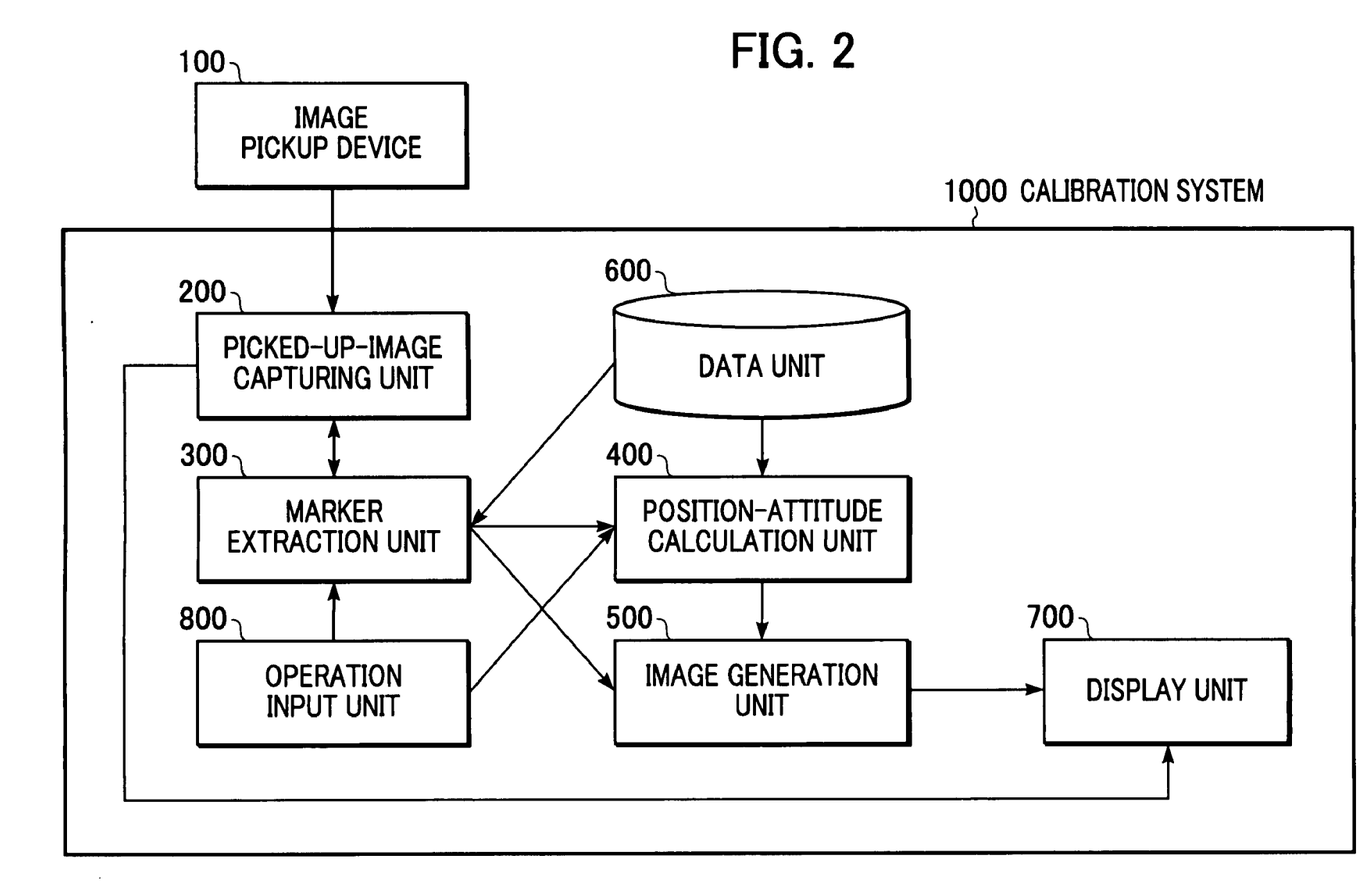
FIG. 2 is a block diagram illustrating the schematic configuration of a system according to the first embodiment.

FIG. 2 is a block diagram schematically illustrating a calibration system 1000 of the present embodiment.

In FIG. 2, a camera to be calibrated is connected to this calibration system 1000. An image pickup device 100 is also connected to the calibration system 1000. This image pickup device 100 is fixed to a predetermined position in a subject space, so as to take a view of the subject space and markers determined therein.

A picked-up-image capturing unit 200, which inputs an image signal photographed by the fixed image pickup device 100, converts the input image signal into a predetermined format suitable for a display unit 700 and a marker extraction unit 300, and transmits the converted image signal to the display unit 700 and the marker extraction unit 300 on receiving a request from the marker extraction unit 300.

An operation input unit 800 is realized by various types of interfaces including a mouse, a keyboard, and so forth. A signal input by the operator is input to this operation input unit 800, as data. The image-display mode selection function, the marker-extraction process mode selection function, and the extraction-parameter change function used for extracting markers are achieved by this operation input unit 800. The operation input unit 800 is used for inputting data, where the operator extracts a marker manually, and inputting an instruction for executing a command issued for calculating the position and orientation of the camera.

The signal input from the operation input unit 800 is converted into a predetermined format and transmitted to a processing unit therefor. More specifically, a command for the changing mode or the extraction parameters is transmitted to the marker extraction unit 300 and a command for calculating the position and orientation of the camera is transmitted to a position and orientation calculation unit 400.

The mode-changing process and the marker extraction process are performed in the marker extraction unit 300. Upon receiving a command for changing the image display mode and the marker-extraction process mode from the operation input unit 800, the marker extraction unit 300 changes the mode according to the input command. Further, upon receiving a command for changing the marker-extraction parameters from the operation input unit 800, the marker extraction unit 300 changes the values of marker-extraction parameters, according to the input command.

In the live-image mode, the marker extraction unit 300 transmits an instruction for transmitting a photographed image to the picked-up-image capturing unit 200 and reads the transmitted photographed image. Subsequently, the marker extraction unit 300 can use the latest image as the subject image. In the still-image display mode, the marker extraction unit 300 determines that a photographed image previously read at the time when the still-image display mode is selected is the subject image. The marker extraction unit 300 does not update this subject image until when the live-image display mode is selected.

In the automatic-extraction process mode, the marker extraction unit 300 performs image processing according to the marker information read from a data unit 600 and the above-described marker extraction parameters, thereby extracting markers on the subject image. In this mode, whenever the subject image is updated, the markers are successively extracted and the result of marker extraction is updated.

In the manual-extraction process mode, data input by the operator and transmitted from the UI 10 is determined to be the result of the marker extraction process of the subject image. If this mode is selected, the position of specified data is used, even though the subject image is updated.

When an input is received via the camera-parameter calculation execution button 70, the marker extraction unit 300 transmits marker extraction information, which is the result of the marker extraction process, to the position and orientation calculation unit 400. If the number of extracted markers is less than three at the time where the camera-parameter calculation execution button 70 is pressed, where three is a minimum number required for performing calibration, an alarm is issued by the marker extraction unit 300. In other embodiments, the camera-parameter calculation execution button 70 is not responsive until the number of extracted markers becomes three.

Upon receiving a command for calculating the position and orientation of the camera from the operation input unit 800, the position and orientation calculation unit 400 calculates the position and orientation of the camera. The position and orientation calculation unit 400 then calculates the theoretical values of image coordinates of the markers, based on the world coordinates of the markers and the initial values of the position and orientation of the camera. Next, the unit calculates a position and orientation of a camera so as to minimize the sum of differences between the theoretical values of the markers and the measurement values thereof transmitted from the marker extraction unit 300, as marker information. The value of the calculated position and orientation is transmitted to an image generation unit 500.

The information on each of the markers includes the world coordinates, the identifier (ID), and so forth. Such information can be manually changed or corrected by the operator by using a setting unit (not shown). The set marker information is provided in list form in a "Marker list" area in the UI 10, as shown in FIG. 1.

Since at least three markers are required in this embodiment, an alert signal is provided if the number of markers set by the setting unit is less than three.

The image generation unit 500 generates a computer graphic (CG) image for making the result of marker extraction visible, based on the marker extraction information transmitted from the marker extraction unit 300. The CG image is used for indicating the marker position by the symbol × and enclosing each of the identified markers by a box. After the position and orientation information is transmitted, the image generation unit 500 generates a CG image (the X, Y, and Z axes in FIG. 1) for determining whether the transmitted information is accurate. The generated CG image data is transmitted from the image generation unit 500 to the display unit 700.

The data unit 600 controls various types of data. The data includes marker information, information about the position and orientation of the image pickup device 100 obtained in early stages of the calibration, marker extraction parameters, marker extraction algorithms, camera-position and orientation calculation algorithms, data on CG image generated by the image generation unit 500, and so forth.

The display unit 700 superimposes the CG image generated by the image generation unit 500 on an image transmitted from the picked-up-image capturing unit 200 and displays an obtained image on the image display unit 20. The operator determines the state of extracted markers and the accuracy of the calculated position and orientation of the camera by observing the superimposed image. The operator observes the symbol × or the box shown in FIG. 1 indicating the position of identified marker. Where the operator determines that the marker extraction process is completed, a command for calculating the position and orientation of the camera is issued by using the camera-parameter calculation execution button 70. When the position and orientation of the camera is calculated, the operator observes the X, Y, and Z axes shown in FIG. 1. If the accuracy of the calculated position and orientation is determined to be good, the operator terminates the calibration.

Figure 3:
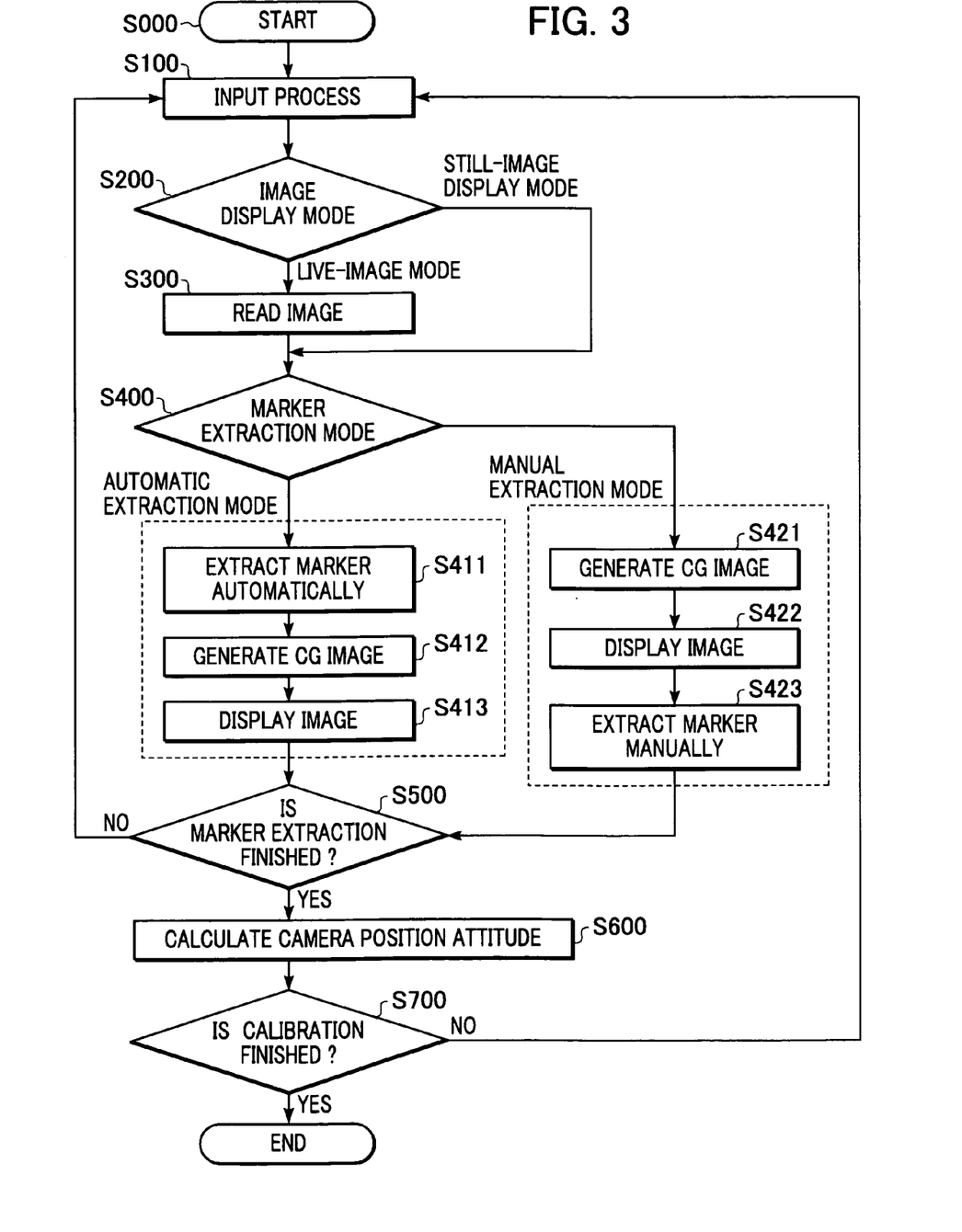
FIG. 3 is a flowchart illustrating processing procedures according to the first embodiment, where the processing procedures calibrate the position and orientation of a camera.

FIG. 3 is a flowchart illustrating the marker extraction process according to this embodiment.

The marker extraction process of this embodiment is started at step S000. Data on initial settings is read from the data unit 600, and initial settings are made. The live-image mode is selected as the image-display mode and the automatic extraction mode is selected as the marker-extraction process mode. Then, default values are provided for the marker extraction parameters. Further, data on the markers is transmitted to the marker-extraction process unit 300. The data on the markers includes information about the identifiers, positions, colors, sizes, shapes, and so forth of the markers.

At step S100, the operation input unit 800 determines whether an input command has been received from an operator. If an input command has been received, it is transmitted to the marker extraction unit 300. The marker extraction unit 300 determines the type of the command and performs a suitable process. Where the command is issued for changing the marker-extraction process mode, the marker extraction unit 300 changes the marker extraction mode. Where the command is issued to change the marker extraction parameters, the marker extraction unit 300 changes the specified parameters. Where the command is issued to calculate the position and orientation of the camera, the marker extraction unit 300 generates a flag for indicating that the marker extraction process is finished.

At step S200, the marker extraction unit 300 performs image-display mode determination. If the image display mode is the still-image mode (subject image previously read), the process advances to step S400. Where the image display mode is the live-image display mode and the subject image is not read, the process advances to step S300.

At step S300, the marker extraction unit 300 requests the picked-up-image capturing unit 200 to transmit an image. The picked-up-image capturing unit 200 transmits an image from the image pickup device 100 to the marker extraction unit 300 and the display unit 700.

At step S400, the marker extraction unit 300 determines the type of marker-extraction process mode. If the automatic-extraction process mode is used, the process advances to step S411. If the manual-extraction process mode is used, the process advances to step S421.

The processing procedures performed at steps S411 to S413, when the automatic-extraction process mode is selected, are described as follows.

At step S411, markers are automatically detected from the subject image through image processing according to the marker-extraction parameters. The result of the marker-extraction process is transmitted to the image generation unit 500.

At step S412, the image generation unit 500 generates a CG image for making the marker extraction result visible. This CG image is transmitted to the display unit 700.

At step S413, the subject image and the result of the marker-extraction process are displayed on the display unit 700. The operator is aware of the state of marker extraction by observing the display unit 700.

The processing procedures performed at steps S421 to S423, when the manual-extraction process mode is selected, are described as follows.

At step S421, the image generation unit 500 generates a CG image for making all the results of past marker extraction visible. This CG image is transmitted to the display unit 700.

At step S422, the subject image and all the result of the past marker extraction are displayed on the display unit 700. The operator is aware of the state of marker extraction by observing the display unit 700.

At step S423, marker information input by the operator through the operation input unit 800 is maintained, as the result of the marker-extraction process. This result is transmitted to the image generation unit 500.

If it is determined in step S500 that the marker extraction process is finished (as indicated by generation of a flag), the process advances to step S600. Otherwise (if it is determined in step S500 that the marker extraction process is not finished), the process returns to step S100 and the marker extraction process is repeated.

At step S600, the position and orientation calculation unit 400 calculates the position and orientation of the camera. In this embodiment, this position and orientation calculation unit 400 calculates the theoretical value of the image coordinates of each of the markers, based on the world coordinates of each of the markers given under 1., above, and the position and orientation of the camera given under 3., above, that are stored at the early stage of the calibration, as known information. Then, the position and orientation calculation unit 400 calculates a position and orientation of the camera by using known nonlinear iterative least minimization method for minimizing the sum of differences between the theoretical values of the markers and the measurement values thereof.

If the operator determines that calculation of the position and orientation of the camera is failed at step S700, the process returns to step S100 and the above-described procedures are repeated until the calculation succeeds. Where the operator determines that the calculation succeeded, the process is terminated.

Thus, in this embodiment, the position and orientation of the camera is calculated, based on the differences between the theoretical values of the markers and the measurement values thereof. However, the position and orientation can be calculated according to another method, so as to satisfy the relationship between the world coordinates of the markers and the coordinates of the picked-up images. That is, the position and orientation can be calculated by solving a PnP problem.

Further, in this embodiment, the calibration of the camera position and orientation is performed by using at least one picked-up image showing the markers with known world coordinates. However, the present invention can be achieved in various ways. For example, the calibration can be performed by extracting markers or natural feature points shown in the picked-up image. That is, the present invention can be used for calibration of camera parameters irrespective of whether the parameters are internal (intrinsic), external (extrinsic), or both of them. The camera external (extrinsic) parameters means information about the position and orientation of a camera that is fixed in a predetermined space, and the camera internal (intrinsic) parameters means information about the lens distortion and focus distance of a camera. Further, the present invention can be used for a system for photographing an object with markers thereon and detecting the position and orientation of the photographed object, where the position (world coordinates) of the camera is known.

As has been described, at least three markers that are not in line with one another are extracted for calibrating the position and orientation of a camera.

According to this embodiment, both the live-image display mode and the still-image display mode, as well as the automatic-extraction process mode and the manual-extraction process mode for marker extraction are used based on various conditions. Although all necessary markers are not displayed, marker extraction may still be performed with relative ease.

For example, if the necessary markers become alternately visible and invisible, so that it becomes difficult to simultaneously photograph all of the necessary markers, the live-image display mode and the manual-extraction process mode are used in combination. Thus, if the necessary markers are visible in a live image, the operator manually specifies the markers to extract them. Since live images are successively obtained until the operator finishes specifying all the necessary markers, all the necessary markers can be used for the calibration.

Figure 4A:
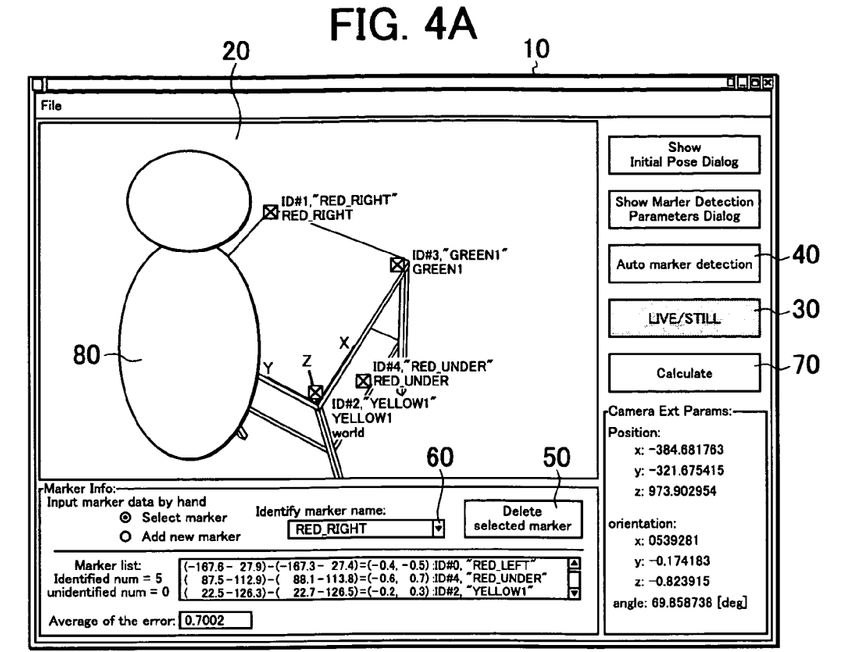
FIG. 4 illustrates a UI for performing the marker extraction process, where live-image display mode and manual-extraction process mode are used in combination, according to an embodiment of the present invention.
Figure 4B:
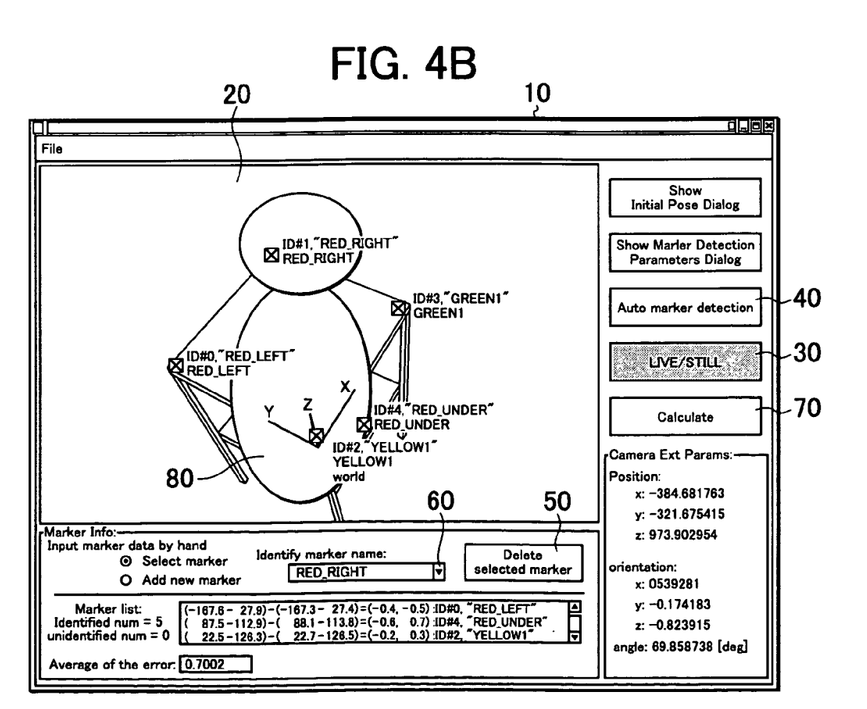

FIGS. 4A and 4B illustrate use of the live-image display mode and the manual-extraction process mode in combination. In FIG. 4A, an operator cannot specify the marker Red_LEFT in the lower-left part of a table because it is hidden by a person 80. Therefore, markers other than the marker Red_LEFT can be specified. However, where the person 80 moves to the middle part of the image, as shown in FIG. 4B, the operator can specify the left marker Red_LEFT. In this drawing, two markers that were specified by the operator are hidden by the person 80. However, these markers were already specified by the operator in the past, as shown in FIG. 4A. Therefore, a graphic image is displayed on the screen for indicating that these markers had already been specified and the information about these specified markers. Thus, the operator is aware of all the markers specified in the past, even though the markers are hidden.

Since the present invention is used for a case where the position of a camera is fixed, the position of each of markers displayed on an image is fixed, even though the operator extracts the markers on an image photographed at different time, as in the case where all the markers displayed on a single image are photographed.

If the markers are photographed in good condition once, where it is difficult to continue photographing markers in good condition, the operator selects the still-image display mode and captures a still image, thereby extracting necessary markers. The user can easily extract the markers by using the automatic-extraction process mode. Further, as described above, after the markers are extracted through the automatic extraction process, the operator can select the manual-extraction process mode and adjust the extracted markers. Subsequently, the accuracy of the marker extraction increases.

The marker extraction is significantly affected by environmental conditions, such as illumination conditions of the real space. Therefore, adjustment of either the environmental conditions or the marker extraction conditions may be performed. For performing this adjustment, the live-image display mode and the automatic-extraction process mode may be used in combination, so as to obtain the adjustment result in real time.

Thus, according to this embodiment, the position and orientation of a fixed camera can be quickly and more accurately calibrated without difficulty.

In the above-described embodiment, the still-image display mode and the live-image display mode can be used, as the display mode. However, other display modes such as intermittent display mode may be used, where the update timing of the intermittent display mode is slower than that of the live-image display mode.

OTHER EMBODIMENTS

It is to be understood that the advantages of the present invention can also be achieved by supplying a program code of software for implementing the functions of the above-described embodiment to a computer (CPU, MPU, etc.) of an apparatus or system connected to devices so as to make the devices operate for implementing the functions of the above-described embodiment and making the devices operate according to the program stored in the computer in the apparatus or system.

In that case, the program code itself of the software achieves the functions of the above-described embodiment, and thus the program code itself and means for supplying the program code to the computer, for example, a storage medium storing the program code constitute the present invention.

The storage medium for storing the program code may be, for example, a floppy (registered trademark) disk, a hard disk, an optical disk, a magneto-optical disk, a CD-ROM, a magnetic tape, a non-volatile memory card, a ROM, etc.

Furthermore, not only by the computer executing the supplied program code, but also by the program code functioning in association with an OS (operating system) running on the computer, or another application software or the like, the functions of the above-described embodiment may be achieved. This program code can be used in another embodiment of the present invention.

Further, after the supplied program code is stored in a memory of a function extension board of the computer or a function extension unit connected to the computer, a CPU or the like in the function extension board or the function extension unit may execute part of or the entire process based on an instruction of the program code, thereby achieving the functions of the above-described embodiment. This example is also one of embodiments of the present invention.

As described above, the present invention uses the live-image display mode for successively obtaining photographed images that are successively input and the still-image display mode for obtaining a photographed image that is input at predetermined time. Therefore, markers can be extracted by using photographed images obtained in either mode. Further, the markers can be manually extracted from live images (this function is achieved by the function of maintaining the positions of the extracted markers, even though the subject image is updated). Therefore, by switching between these modes, the accuracy of marker extractions is high under all conditions.

For example, where the surroundings constantly change or all the necessary markers become alternately visible and invisible, then the live-image display mode is selected, since all the necessary markers cannot be simultaneously photographed. Further, if it is difficult to continuously photograph the markers in good condition, then the still-image display mode is selected. In this manner, the markers can be easily extracted with a high degree of accuracy.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing method for obtaining camera parameters of an image pickup device fixed in a predetermined position in real space by using markers fixed in a predetermined position in real space, the method comprising the steps of:

selecting one image obtain mode from among a plurality of image obtain modes including a first image obtain mode for obtaining a moving image, and a second image obtain mode for obtaining at least one still image;

obtaining the image according to the selected image obtain mode, wherein the obtained image is picked up by the image pickup device;

selecting one marker extraction mode from among a plurality of marker extraction modes including a first marker extraction mode for automatically extracting the markers in the obtained image, and a second marker extraction mode for manually extracting markers in the obtained image;

extracting the markers included in the obtained image based on the selected marker extraction mode;

superimposing information indicating the extracted marker on the obtained image;

displaying the superimposed image; and determining camera parameters of the image pickup device by using image coordinates of the markers, wherein, if the first image obtain mode is selected, the image is a moving image and the information indicating the extracted markers is superimposed in the moving image, and, if the second image obtain mode is selected, the image is a still image and the information indicating the extracted markers is superimposed in the still image, and wherein if the first obtain mode and the second marker extraction mode are selected, the information indicating the marker manually extracted on the past frame image is displayed on the current frame image.

2. An information processing method according to claim 1, further comprising displaying the determined camera parameters of the image pickup device.

3. An information processing method according to claim 1, wherein the camera parameters are determined such that the sum of differences between theoretical and measured values of the markers is minimized.

4. An information processing method according to claim 1, wherein the markers have known world coordinates and the determining step is used for deriving camera parameters of the image pickup device by using the image coordinates and world coordinates of the markers.

5. An information processing method according to claim 1, wherein the markers include at least three markers.

6. An information processing method according to claim 1, wherein the first marker extraction mode automatically extracts markers based on predetermined extraction conditions.

7. An information processing method according to claim 6, further comprising the step of changing the extraction conditions;

and wherein extracting the markers included in the obtained image based on the selected marker extraction mode is based on the changed extraction conditions in response to the changed extraction conditions.

8. An information processing method according to claim 1, further comprising the step of restricting operation of the determining step, wherein the number of the markers extracted in the marker extracting step is determined, and if the determined number is less than a predetermined number, the operation of the determining step is restricted.

9. An information processing method according to claim 1, further comprising the step of alerting a user, wherein the number of the markers extracted in the marker extracting step is determined, and if the number is less than a predetermined number, the user is alerted.

10. A computer program stored in a storage medium for making a computer perform a method according to claim 1.

11. A computer readable storage medium storing a computer program of claim 10.

12. The method of claim 1, wherein the camera parameters are about camera position and orientation.

13. An information processing apparatus for obtaining camera parameters of a camera fixed in a predetermined position in real space by using markers fixed in a predetermined position in real space, the information processing apparatus comprising:

an image obtain-mode selecting unit configured to select one image obtain mode from among a plurality of image obtain modes including a first image obtain mode for obtaining an image picked up by the camera, as a moving image, and a second image obtain mode for obtaining at least one image picked up by the camera, as a still image;

an image obtaining unit configured to obtain the image picked up by the camera according to the image obtain mode, the image obtain mode being selected by the image obtain-mode selecting unit;

a marker extraction selection unit configured to select one marker extraction mode from among a plurality of marker extraction modes including a first marker extraction mode for automatically extracting the markers in the obtained image, and a second marker extraction mode for manually extracting markers in the obtained image;

a marker extraction unit configured to extract the markers included in the obtained image based on the marker extraction mode selected by the marker extraction selection unit;

a superimposing unit configured to superimpose information indicating the extracted marker on the obtained image and to display the superimposed image; and a determining unit configured to determine camera parameters of the camera by using image coordinates of the markers, which are extracted by the marker extraction unit, wherein, if the first image obtain mode is selected by the image obtain-mode selecting unit, the image is a moving image and the information indicating the extracted markers is superimposed in the moving image, and, if the second image obtain mode is selected by the image obtain-mode selecting unit, the image is a still image and the information indicating the extracted markers is superimposed in the still image, and wherein if the first obtain mode and second marker extraction mode are selected, the information indicating the marker manually extracted on the past frame image.

14. An information processing apparatus for obtaining camera parameters of a camera fixed in a predetermined position in real space by using markers fixed in a predetermined position in real space, the information processing apparatus comprising:

image obtain-mode selecting means for selecting one image obtain mode from among a plurality of image obtain modes including a first image obtain mode for obtaining an image picked up by the camera, as a moving image, and a second image obtain mode for obtaining at least one image picked up by the camera, as a still image;

image obtaining means for obtaining the image picked up by the camera according to the selected image obtain mode;

marker extraction selection means for selecting one marker extraction mode from among a plurality of marker extraction modes including a first marker extraction mode for automatically extracting the markers in the obtained image, and a second marker extraction mode for manually extracting markers in the obtained image;

marker extraction means for extracting markers included in the image based on the marker extraction mode selected by the marker extraction selection means;

superimposing means for superimposing information indicating the extracted marker on the obtained image;

displaying means for displaying the superimposed image; and determining means for determining camera parameters of the camera by using image coordinates of the markers, which are extracted by the marker extraction means, wherein, if the first image obtain mode is selected by the image obtain-mode selecting means, the image is a moving image and the information indicating the extracted markers is superimposed in the moving image, and wherein, if the second image obtain mode is selected by the image obtain-mode selecting means, the image is a still image and the information indicating the extracted markers is superimposed in the still image, and wherein if the first obtain mode and the second marker extraction mode are selected, the information indicating the marker manually extracted on the past frame image is displayed on the current frame image.

* * * * *